Oct. 8, 1957 A. J. REINSCH ET AL 2,808,897
APPARATUS FOR CONTACTING LIQUID AND VAPOROUS MATERIALS
Filed May 22, 1953 4 Sheets-Sheet 1
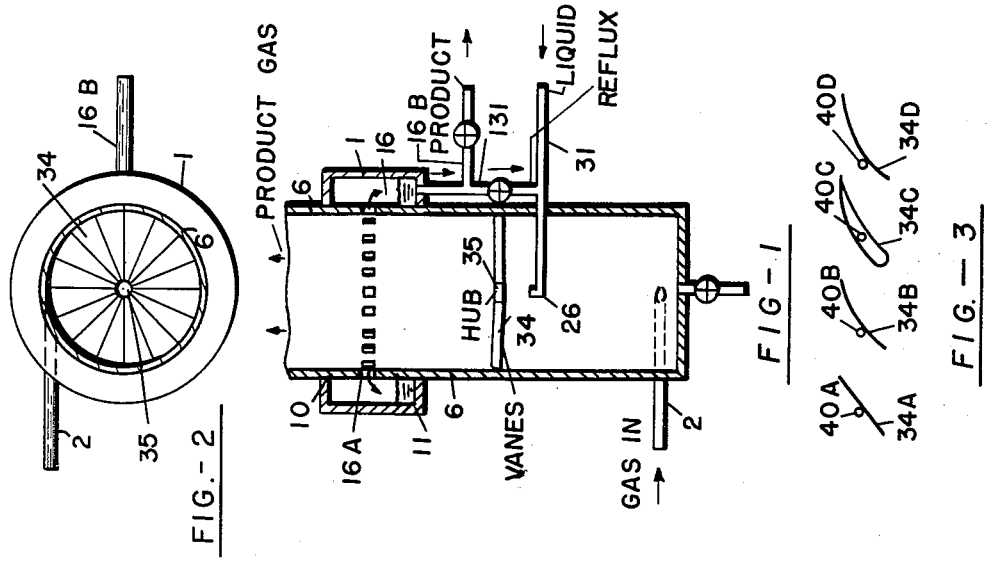
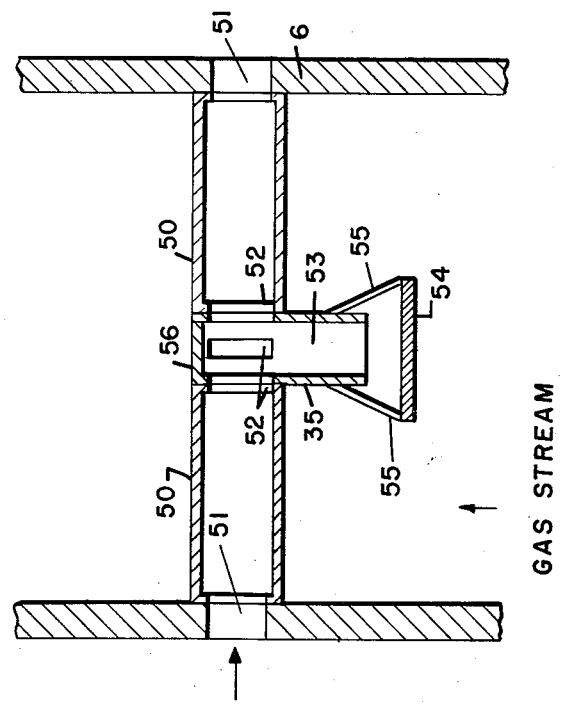
ARTHUR J. REINSCH
HENRY J. HIBSHMAN INVENTORS
BY W. O. J Feilman ATTORNEY

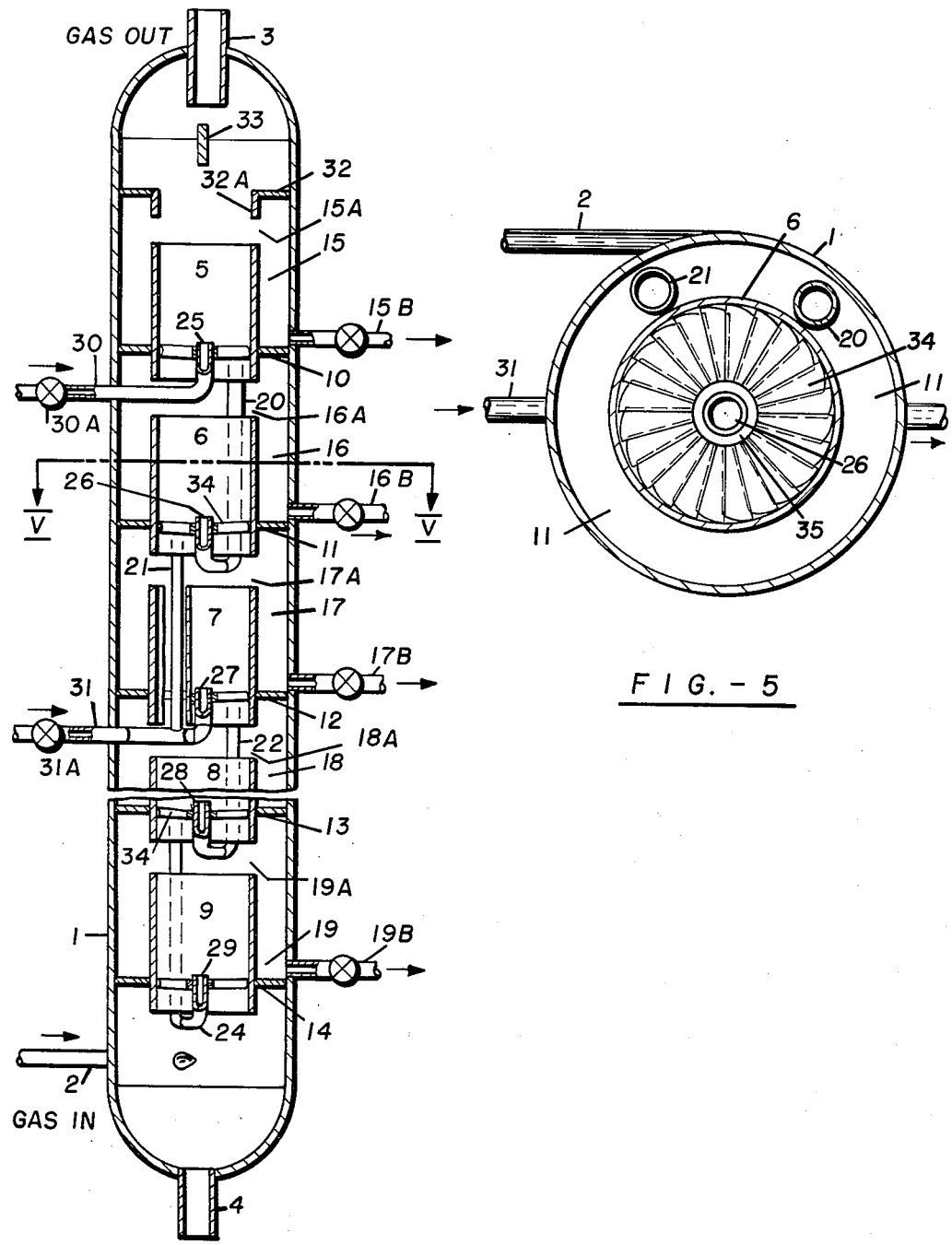

ARTHUR J. REINSCH
HENRY J. HIBSHMAN
INVENTORS
BY W. O. Heikman ATTORNEY

ARTHUR J. REINSCH
HENRY J. HIBSHMAN
INVENTORS

United States Patent Office 2,808,897
Patented Oct. 8, 1957

2,808,897

APPARATUS FOR CONTACTING LIQUID AND VAPOROUS MATERIALS

Arthur J. Reinsch, Westfield, and Henry J. Hibshman, Plainfield, N. J., assignors to Esso Research and Engineering Company, a corporation of Delaware Application May 22, 1953, Serial No. 356,652

5 Claims. (Cl. 183—25)

The present invention relates to the contacting of liquids with gases or vapors and more particularly relates to an improved contacting apparatus by means of which liquid may be brought into intimate contact with a gas or vapor and subsequently separated therefrom with greater efficiency and with a lower loss in energy than in conventional contacting equipment.

The apparatus of the invention comprises a substantially cylindrical vessel divided into longitudinally-spaced contacting zones or stages through which a gas or vapor stream may be passed at velocities ranging from about 10 to about 200 ft./sec. Radial, arcuately-spaced vanes positioned within each stage cause the gas or vapor stream to follow a helical path making an angle of about 30–55° with a plane normal to the longitudinal axis of the vessel. A liquid inlet is provided in each stage by means of which liquid may be introduced into the stage at a point on the longitudinal center line of the vessel. Slots or other openings in the vessel wall from one-half to six and preferably from one to three vessel diameters downstream from each liquid inlet serve as liquid outlets.

During operation of the apparatus, liquid is introduced at the center of each contacting zone or stage and shattered into fine droplets by the swirling stream of gas or vapor passing through the vessel. These droplets travel along a spiral path to the vessel wall in intimate contact with the gas or vapor and, upon reaching the wall, flow in a stream along the wall concurrently with the gas or vapor to the liquid outlet. The liquid is discharged through the outlet by centrifugal force and the gas or vapor continues through the vessel to the next stage.

The exact nature of the invention can be more fully understood from the following detailed description and the accompanying drawings, in which:

Fig. 1 is a vertical section through a contacting stage of the character contemplated.

Fig. 2 is a top view of the stage section depicted in Fig. 1.

Fig. 3 illustrates cross-sectional views of vane types that may be employed in the present apparatus.

Fig. 4 is a vertical section through a contacting vessel of the character contemplated, such as might be employed and operated for the fractionation of hydrocarbon vapors, with parts broken away to show construction details.

Fig. 5 is a cross-sectional view of such an apparatus, taken along the line V—V of Fig. 4 and enlarged to show details of the means shown in Fig. 4 for imparting rotational flow motion to the materials passed through the vessel.

Fig. 6 is a vertical section through a modified form of apparatus that is particularly attractive as a means for introducing a stream of liquid into contact with vapors within a vessel of the type contemplated herein.

Figure 7:
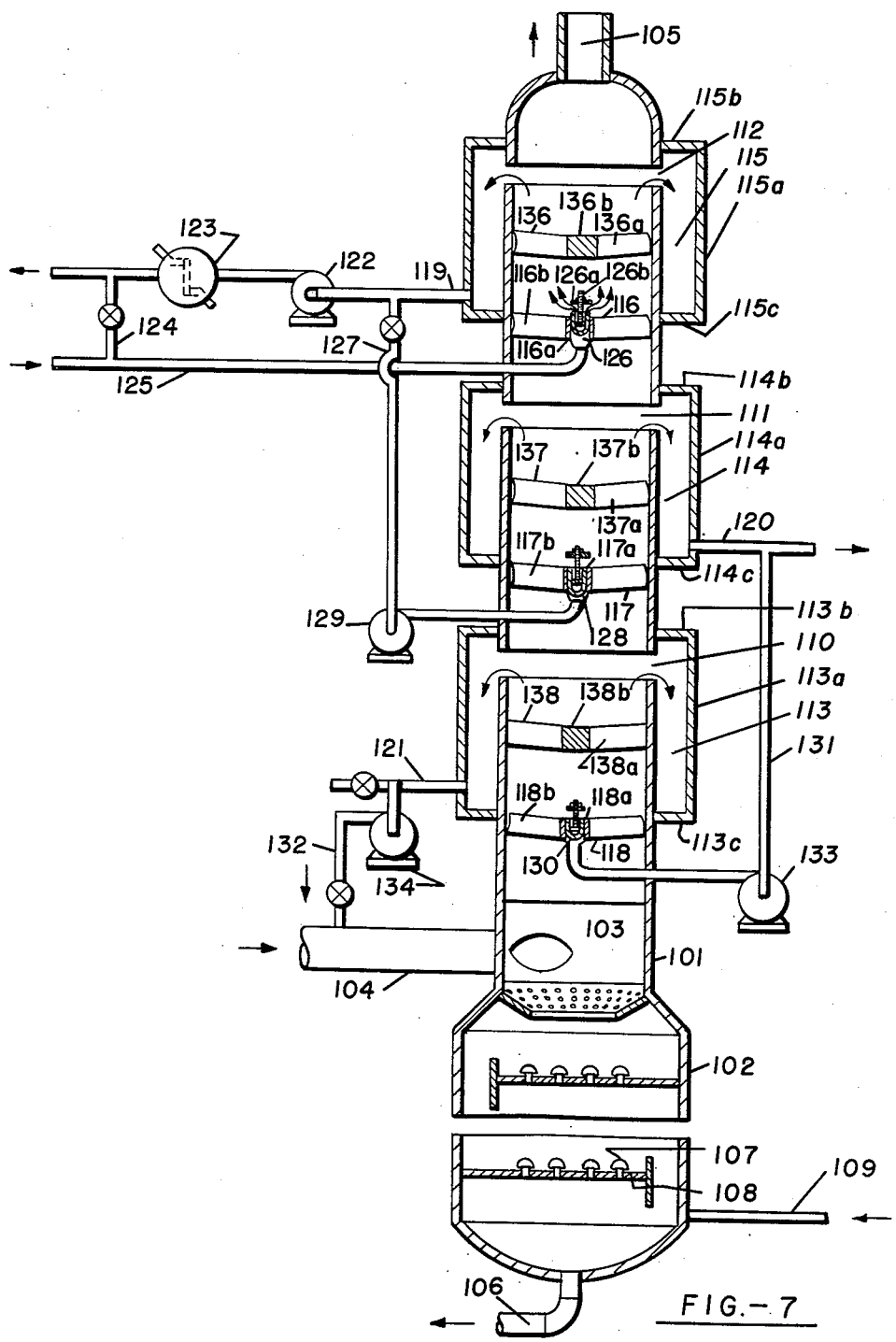
Fig. 7 is a vertical section through a portion of an alternate form of a vessel similar to that which is shown in Fig. 4.

Referring first to Figs. 1 and 3, there is illustrated therein a contacting stage of the type described herein. The stage comprises a cylindrical wall 6 which in this case is the cylindrical wall of both the contacting stage and the overall contacting zone; gas inlet conduit 2; liquid inlet conduit 31; liquid outlet 16a and vanes 34. In accordance with the embodiment shown in Figs. 1 and 2, a gas stream enters tangentially to the wall 6 of the stage. As a result of its tangential entry the gas stream is given a whirling motion which in turn causes it to progress in a helical manner through the stage. It will be noted at this point that the gas stream may enter in other ways than the tangential one described, but in those cases it will be generally necessary to impart a spinning motion to the stream by means of vanes, propellers, or the like. Thus, the gas stream possesses a velocity component that is substantially parallel to the longitudinal axis of the stage or zone and another component that is substantially lateral thereto.

The gas stream as it moves upward through the stage encounters liquid at point 26 which enters the stage through line 31. A nozzle, spinning disk, spray or other conventional liquid dispersing means may be employed at the point of liquid entry 26. It will even be generally satisfactory if the liquid merely enters the stage substantially as a solid stream, since the gas stream possesses sufficient energy to shatter the liquid into small droplets. The gas stream at this point tends to lose its lateral velocity component and also its angle of swirl. Accordingly, a set of radial vanes 34 are positioned immediately downstream from the liquid inlet 26. These vanes extend radially from the center line of the stage to the wall 6. They are preferably connected at the center by a device such as hub 35 and are preferably supported by the wall 6. In passing through vanes 34 the gas stream recovers its desired lateral velocity component and its angle of swirl whereupon the liquid droplets contained in the stream are thrown outwardly and against the wall 6. The liquid collecting on the wall flows in the same overall direction as the gas stream until it reaches the point 16a where it passes through the wall 6 and enters a liquid collecting zone 16. Zone 16, as illustrated, may be formed by cylindrical wall 1 and annular plates 10 and 11 positioned between the internal surface of wall 1 and the external surface of wall 6.

The liquid collected in zone 16 flows through line 131 and thence to line 16b and/or line 31 as governed by the position of the two valves illustrated in the figure. The gas stream upon being disengaged from the liquid at point 16a passes downstream into a succeeding stage or a subsequent section of the overall contacting zone. It will be realized that numerous modifications may be made in the apparatus illustrated in Fig. 1. For example, the centrifugal forces employed by the present invention make it possible to position the contacting zone in any position with respect to the vertical. It will be noted that in those instances where the gas stream flows in other than a vertical direction, it may be necessary to employ pumps or other liquid transfer means in order to remove the liquid products that are collected within the various liquid collecting zones, as for example zone 16. Such transfer means are considered to be well within the knowledge of persons skilled in the art.

Referring to Fig. 3, four types of vanes suitable for use as the vanes within each contacting stage are illustrated. The vanes shown consist of a straight vane 34a, a curved vane 34b, an air foil type vane 34c, and another curved vane 34d which possesses an extended trailing edge as contrasted with the curved vane 34b. The various blades are also depicted as possessing pivot points 40a, 40b, 40c, and 40d, in order to show that these blades may be made adjustable in their angular disposition.

The type of blade particularly preferred for the purposes of the present invention is the one identified by the character 34c. This air foil type possesses a rounded blunt-shaped leading edge and an extended thin trailing edge. This type is generally hollow and possesses pressure drop characteristics superior to the other three types. In connection with the description of this blade, it will be particularly noted that it is considered eminently desirable to introduce liquid feed within each stage of a contacting zone by flow through one or more of the hollow air foil blades. This procedure would eliminate the internal conduit leading to the point of liquid entry 26 shown in Fig. 1 and in effect would combine it directly within the vanes 34 of the same figure.

Another embodiment of the present invention is shown in Figs. 4 and 5 wherein the numeral 1 designates a contacting vessel such as might be employed for the fractionation of hydrocarbon vapors. The vessel illustrated is shown as an independent, vertically disposed unit, but is adapted to various modifications as later described. This vessel 1 is provided with a lower vapor inlet conduit 2 opening into the vessel in tangential relation thereto, and an upper outlet conduit for discharge of uncondensed vapors, designated by the numeral 3. An outlet for higher boiling components separated as a liquid from the feed stream, introduced through line 2 is provided by means of the conduit 4 opening from the bottom of the vessel.

Interiorly of the vessel 1, a series of tubular conduit elements such as elements 5, 6, 7, 8 and 9 are supported coaxially of the vessel, in close radially spaced relation to the inner walls thereof, and in spaced end to end relation one to another longitudinally of the vessel. Each of these conduit elements is connected or joined to the inner wall of the vessel by means of an annular plate member, such as the members 10, 11, 12, 13 and 14, disposed intermediate the ends of the corresponding elements 5, 6, 7, 8 and 9, respectively. The outer walls of the conduit elements, the plates, and the inner wall of the vessel form between them a series of liquid receiver chambers such as chambers 15, 16, 17, 18 and 19, respectively, each having an annular inlet portion at the upper end as indicated at 15a, 16a, 17a, 18a, and 19a, and which portion, in the structure shown, is formed between the spaced ends of the respective conduit elements. In the structure as shown, the series of conduit elements such as 5, 6, 7, 8, and 9, in effect define a substantially continuous vapor flow path, with a series of liquid outlets arranged in longitudinally spaced relation peripherally thereof. If desired, the apparatus may be constructed as a double walled vessel comprising two coaxial radially spaced tubular members separated and joined by means for annular plate members such as the member 10 to 14 shown in Fig. 4, to form a longitudinal series of receiver chambers between the inner and outer walls of the vessel. In such construction, peripheral inlet portions corresponding to 15a to 18a of Fig. 4 would be provided by punched or cutout slots or another discontinuous type of opening in the inner wall of the vessel.

Preferably each of the several receiver chambers is provided with one or more condensate draw-off lines such as are indicated by the numerals 15b, 16b, 17b, and 19b, each being provided with a suitable control valve as shown. These chambers are also provided with liquid return conduits such as the substantially J-shaped conduits 20, 21, 22, and 24, which extend longitudinally of the vessel in a direction opposite to that of vapor flow therethrough, through at least one preceding chamber and the annular plate member thereof, and then radially inward to a terminus in a nozzle or discharge portion such as indicated by the numerals 26, 27, 28, and 29, which portion is disposed in substantially coaxial relation to the elements 6, 7, 8, and 9, and preferably opens in the direction of vapor flow therethrough, extending beyond the upstream ends of the respective elements 6, 7, 8, and 9. For example, the return conduit 20 opens from the receiver chamber 15 through the plate 10, extends upstream through the chamber 16 and plate 11, and radially inward below the upstream end of element 6, to terminate in the nozzle 26 extended downstream within and coaxially of element 6. Also as shown in Fig. 4, a nozzle or discharge conduit element 25 is disposed in similar relation to the element 5 and is connected, as by means of a conduit 30, through valve 30a, to an auxiliary source of a condensing liquid. This liquid may be derived from a source independent of the system concerned, or may be derived by further condensation of vapors discharged by way of the outlet conduit 3. Also, each of the conduits 20, 21, 22, and 24 may be provided for the supplementary introduction of a condensing liquid from a suitable auxiliary source. Suitable means for introduction of a supplementary liquid or feed into any of the liquid return conduits is indicated by the conduit 31 shown in Fig. 4 as connected to the conduit 21. The conduit 31 is provided with a suitable valve 31a.

In conjunction with the conduit element 5, and to complete the enclosure of the receiving chamber 15, an annular plate element 32 is provided beyond the downstream end of element 5, with an annular collar-like portion 32a joined thereto, said portion 32a being of a diameter substantially equal to that of element 5 and extended in the direction of the end of element 5 into spaced relation thereto. If desired, flow straightening or other means, such as vertical baffle 33, may be disposed in the vapor space between the plate 32 and outlet conduit 3. If desired, a plurality of vertical baffles similar to baffles 33 and extending radially outward from the longitudinal axis of vessel 1 may be employed in place of a single baffle.

Also, as shown in Figs. 4 and 5, each of the internal conduit elements such as elements 5, 6, 7, 8, and 9 is provided with additional means to impart rotational movement to fluids passed through the vessel by way of said elements. In the structure illustrated, the additional means is formed in each of the several conduit elements by a series of radially disposed tilted vanes 34 secured at their outer ends to the inner surface of a conduit element, and at their inner ends to an annular hub 35. The vanes here are disposed adjacent the inlet or upstream end of each conduit element with the liquid return conduit nozzle portion for such conduit element extending through the hub 35, opening above the vanes.

The vanes may have a flat or curved profile as desired. Preferably a hollow, curved and streamlined vane type is employed such as to provide for a maximum swirl effect with a minimum pressure drop. Also, the vanes 34 may be secured in fixed relation to the conduit element wall and to the hub 35, or if desired they may be provided for adjustment of the angle of inclination or tilt to provide a range of swirl angles. Swirl angles that are too small result in excessive pressure drops or energy consumption, while swirl angles that are too large preclude effective rotation of the fluids involved and thereby cause a prohibitive degree of liquid entrainment. It is preferred that the vanes be formed and arranged, so that the downstream edge of each vane overlaps the upstream edge of an adjoining vane as shown in Fig. 5.

A typical employment of the apparatus according to the present invention, and of the character as illustrated by Figs. 4 and 5, would be in the fractionation of hydrocarbon vapors for the purpose of segregating liquid fractions of different boiling points therefrom. In such service, a vaporous or a mixed vapor and liquid feed would be introduced into the vessel 1 as by way of the inlet conduit 2.

These vapors could be derived from any suitable source, as by flashing a heated vaporizable liquid material in a separate zone, or in the vessel space preceding the initial contacting or fractionation zone provided by the conduit element 9. Unvaporized liquid materials, or condensate developed in this space may be withdrawn from the vessel by way of the outlet line 4.

From the inlet zone surrounding the inlet line 2, vapors are then passed upwardly through the vane elements 34 in the upstream end of the conduit element 9 with a velocity sufficient to produce rotational movement of the vapor stream and thereby to develop the helical flow pattern previously mentioned, the vane elements being set so as to develop a dry gas swirl or helix angle of from about 30° to 55° and preferably about 35° to 45° above the horizontal. Condensate formed in the first stage provided by the conduit element 9 is separated from the vapor stream by the centrifugal action of the rotating stream, and is thrown radially outward to the inner wall of the element 9. The longitudinal or upward component of motion imparted by the flowing vapor stream carries the separated liquid upward along the conduit wall to be discharged by way of the peripheral outlet 19a at the downstream end of element 9 into the receiving chamber 19.

The uncondensed portion of the vapor stream continues to flow upwardly, and passes through the vane elements 34 positioned in the upstream end of the next succeeding conduit element, and wherein another liquid fraction may condense. The procedure is repeated in succession from stage to stage until the remaining uncondensed vapors pass beyond the downstream end of the last conduit element in the series, as beyond the element 5 in Fig. 4. These uncondensed vapors are then discharged from the vessel 1 as by way of the outlet conduit 3. Means such as vertical baffle plate 33 shown may be provided to dissipate the effect of the rotating vapor stream prior to discharge thereof into the line 3.

The condensate from each stage as accumulated in each receiving chamber, such as in chambers 15, 16, 17, 18 and 19, may be withdrawn therefrom and from the tower, if desired, as by way of product drawoff lines such as 15b, 16b, 17b, and 19b. Usually, however, it is found desirable, as in a conventional system, to provide for recycling or refluxing all or a certain portion of the condensate liquid recovered at each stage. In the system illustrated, provision is made for refluxing condensate. For example, liquid recovered in a chamber, such as chamber 15, will be refluxed to a preceding contacting stage. As shown, the reflux liquid may be withdrawn from chamber 15 by way of the downcomer line 20, and reintroduced by way of the nozzle 26 into contact with the vapor stream entering the conduit element 6 and concurrently therewith. Although in the apparatus as illustrated provision is thus made for reintroducing the reflux liquid into a stage next below that from which it has been recovered, it is within the purview of the invention to accomplish such reintroduction into any suitable stage preceding that from which the liquid is recovered. For example, liquid withdrawn from the chamber 15 could be passed through a suitably extended reflux conduit, and reintroduced into the vapor stream as it enters the conduit elements 7 or 8.

It is also contemplated that the condensate reflux may be supplemented by a suitable liquid material introduced as by way of the line 30 and nozzle 25 and/or by way of the line 31 and nozzle 27. Also, similar connections such as provided by the line 31 may be provided for each of the nozzles to supply an initial feed, or to supplement condensate recovered in the several receiver chambers.

Fig. 6 illustrates a preferred type of apparatus for introducing and dispersing liquid feed within the gas stream flowing through apparatus of the type described in the present invention. The apparatus in Fig. 6 comprises a section of the wall 6 of a contacting stage, vanes 50 secured to the wall 6 and to the hub section 35, a dispersion plate 54 and dispersion plate supports 55. The vanes 50 are hollow and are provided with passages 51 and 52 that line up with corresponding passages in the wall 6 and the hollow hub section 35. Thus, liquid feed may be introduced within the contacting stage by flowing through passageways 51, the hollow portion of vanes 50, the passageways 52, and the hollow portion 53 of hub section 35.

It will be noted that the liquid stream as it flows from passageway 53 into the interior of the contacting stage flows substantially along the longitudinal center line of the stage and in a direction opposite to that of the gas stream. As the liquid leaves the hub section 35 it impinges upon dispersion plate 54 and thereby acquires a lateral or radial direction of flow with respect to the center line of the stage. Plate 54 is preferably of a character to distribute the liquid evenly around its periphery. This dispersion plate or member may be supported as shown by rod-like members 55 that in turn may be attached to the hub section 35. It will be noted that the position of dispersion plate 54 may be fixed or adjustable with respect to the hub section 35. In Fig. 6 the plate is illustrated as being fixed in its position, but it may easily be made adjustable in accordance with ways that are well known to those skilled in the art.

Referring now to the form of apparatus illustrated by Fig. 7 the numeral 101 designates a vertical fractionation vessel having a combined stripper section 102 communicating directly with the lower end of the vessel, and with a vapor disengaging section or flash zone 103 formed in the lower end of the vessel immediately above the stripping section. The numeral 104 designates a tangentially disposed inlet for feed materials. The numeral 105 designates an outlet for uncondensed vapors from the vessel, while the numeral 106 designates an outlet for unvaporized liquid materials from the stripping section.

The stripping section 102 is conventionally provided with a plurality of superimposed vertically spaced transverse tray or plate elements such as bubble cap plates 107. Each plate is provided with a downcomer 108 disposed to provide for downward flow of liquid materials from plate to plate, and lateral flow of liquid across each plate, in generally countercurrent relation to vapors, introduced as by means of a conduit 109, which vapors pass upwardly through the section and plates 107, as by way of the bubble caps and the chimney associated therewith.

Above the inlet 104 the vessel is divided into a series of contacting or fractionation stages. In the apparatus illustrated only three such stages are shown, but any desired number may be provided. These stages are vertically defined as by means of a vertical series of circumferential slot-like passageways, such as designated by the numerals 110, 111, and 112, respectively, opening through the vessel wall into communication with a similar sequence of receiver chambers 113, 114, and 115. Each of these chambers is formed between the exterior wall of the vessel 101, and a series of annular collar elements 113a, 114a, and 115a, encircling the vessel in radially spaced relation thereto, which are joined to the exterior of the vessel wall by means of upper and lower annular plate elements designated respectively by the numerals 113b, 113c, 114b, 114c, 115b, and 115c. Each of the stages defined between the slot-like passageways 110, 111, and 112 has a longitudinal dimension equal to about from 1 to 6 times the diameter of the zone and the vessel 101. Also, as shown, each chamber is provided with one or more condensate or product drawoff conduits such as conduits 119, 120, and 121.

In each of the several contacting or fractionation stages, a vaned element such as designated by the numerals 116, 117, and 118 is disposed transversely of the vessel and adjacent the upstream end of the zone. Each of these elements has a central annular hub portion, designated by the numerals 116a, 117a, and 118a, and a plurality of angularly inclined vanes, such as vanes 116b, 117b, and 118b, extending radially therefrom to a juncture with the vessel walls. The vaned elements 116, 117, and 118 as illustrated in Fig. 7 correspond exactly to the vaned elements 34 as shown in Figs. 4 and 5.

In addition to the condensate drawoff lines, such as lines 119, 120, and 121, provision is also made for recirculation or reflux of condensate from any given stage. As shown in Fig. 7 the line 119 is connected through a pump 122 and a heat exchanger 123 to a branch line 124. The branch line 124 is connected in turn to a supplementary, liquid feed, inlet conduit 125. The conduit 125 enters the vessel 101 radially below the vaned element 116 and in communication with a nozzle or discharge outlet 126. The nozzle is disposed coaxially of the vessel and here extends through the hub 116a to open on the downstream side of the element 116. As shown, the nozzle 126 is provided with means for dispersing liquid discharged therefrom such as a dispersion plate 126a. The plate 126a is preferably adjustably supported with reference to the nozzle outlet as by means of a threaded stud 126b.

The line 119 is also connected as by means of a reflux conduit 127 to a similar discharge nozzle 128 extended through the hub of the vaned element 117. A pump 129 is provided in the line 127. Likewise, the drawoff line 120 is connected to a nozzle 130 in the hub of the vaned element 118 by means of a conduit 131 while the line 121 is connected to the main feed inlet 104 by means of a conduit 132. Pumps 133 and 134 are provided in the respective lines 131 and 132. All of the conduit connections are provided with control valves substantially in the manner shown to permit suitable alternation and control of circulation in and through the several lines as desired.

In the apparatus as illustrated by Fig. 7 additional means is provided for imparting rotational movement to the stream of vapors passed longitudinally of the vessel. Such means, as shown, is provided by an additional series of inclined vane elements, such as designated by the numerals 136, 137 and 138 disposed transversely of the respective zones. These elements correspond to the vaned elements 116, 117, and 118, except that the vanes 136a, 137a, and 138a are joined to solid hubs 136b, 137b, and 138b. The elements 136, 137, and 138 are disposed intermediate the inlet and outlet ends of the respective stage, in vertically spaced relation to the elements 116, 117, and 118, respectively, and to the discharge passageways 112, 111, and 110 respectively.

Operation of the apparatus as shown in Fig. 7 is substantially the same as that of the apparatus illustrated by Figs. 4 and 5. In a typical operation, the feed stream introduced by way of the conduit 104 may be a stream of mixed hydrocarbons boiling in the range of $C_4$ to $C_5$ up to about 690° F., and introduced at a temperature of about 368° F. and a pressure of about 7.0 p. s. i. g. At such temperature and pressure, a part of the feed stream is flashed as introduced into the zone 103. The vaporized materials pass upwardly into the fractionation zone, while the unvaporized liquid passes downwardly through the stripping section 102 by way of the bubble cap plates 107 and downcomers 108. Stripping steam is introduced by way of the line 109 and passes upwardly through the chimneys and bubble caps of plates 107 through the downflowing liquids, and in passage tends to strip components which are vaporizable at the temperatures and pressures existing in the vessel. Unvaporized liquids are finally removed from the section 102 by way of the line 106.

The materials vaporized in zone 103, and by stripping in the section 102, are passed upwardly through the fractionation section at high velocity in combination with steam from the stripping section. Preferably the superficial velocity of vapors passed through the fractionation section is maintained above about 10 to 20 feet per second.

The upflowing vapors from the zone 103 are passed through the vanes 118b of the element 118 which impart a swirling or rotational motion to the flowing stream, and again over the vanes 138a of the element 138 which supplement the rotational effect. As in the apparatus according to Figs. 4 and 5, the vanes are preferably adjusted so that at any given flow velocity the rotating vapor stream will complete one revolution in a distance longitudinally of the zone which is substantially equal to from about one to about six times the diameter of the vessel.

The vapor from the zone 103 passes upwardly from stage to stage in the vessel 101 as a substantially continuous flow stream. In each stage, the vaned elements impart and maintain rotational movement of the stream. During upward passage of the vapors the condensable fractions of the stream are converted to a liquid form, and by the centrifugal action of the rotating stream these liquid fractions are separated from the vapors and thrown against the vessel walls. The forward motion component of the stream and the swirling motion imparted to the liquid condensate carries it upwardly until a peripheral outlet is reached. At this point the condensate is discharged into a receiving chamber for withdrawal or recirculation.

At least a portion of the condensate recovered as from the receiving chambers 113, 114, and 115, is ordinarily employed as a reflux condensing liquid. Condensate from the receiving chamber 115 may be refluxed by way of the lines 119 and 127 and reintroduced into the vessel by way of the nozzle 128, or if desired it may be recirculated through the stage from which recovered by way of conduits 124 and 125, and nozzle 126. In either event, the recycled condensate aids in the condensation of condensable fractions from the vapor stream, and also in production of more sharply cut fractions. As shown in the drawing, condensate from the receiver 114 may be refluxed to the next preceding stage by way of the line 131 and the nozzle 130, while condensate from the receiver 113 may be refluxed by introduction into the feed material in conduit 104 by way of the line 132.

The present invention may be better understood by reference to the following examples which are given to illustrate various aspects of the invention.

EXAMPLE I

A series of vanes were evaluated in a cylindrical vapor-liquid contacting zone of the type described earlier herein. Thin flat vanes, thin curved vanes and hollow airfoil-type vanes were employed at various angles of inclination to provide various swirl angles. Air was passed through the zone at a superficial velocity of 100 ft. per second, and the pressure drop for each set of conditions was determined. The results are presented in the following table:

Table I

| Type of Vanes | Press. Drop, Ft. $H_2O$ at Indicated Swirl Angle | | | |
| --- | --- | --- | --- | --- |
|  | 30° | 35° | 40° | 45° |
| 1. Thin Flat Vanes | 4.3 | 2.5 | 1.6 | 1.2 |
| 2. Thin Curved Vanes | 4.1 | 2.1 | 1.2 | 0.7 |
| 3. Airfoil-type Vanes | 2.8 | 1.4 | 0.6 | 0.3 |

It is apparent from Table I that airfoil-type vanes are markedly superior to conventional, thin, flat or curved vanes in providing the swirl angles desired with much lower attendant pressure drops. It is also apparent that swirl angles in excess of about 35° are desirable from the standpoint of pressure drop.

EXAMPLE II

A series of runs were made in two separate vapor-liquid contacting zones of the type defined by the present invention. One of these units consisted of a single-stage, 2-inch diameter vertical column possessing a stage height of 4 stage diameters. A swirl angle of about 45° was imparted to the gas stream (air) by means of a tangential inlet to the column.

The second unit was a single stage, 2-foot diameter, vertical column possessing a stage height of about 3 diameters. The gas stream (again air) had a swirl angle of 45° created by a single set of radial vanes positioned below the liquid inlet.

The liquid in all instances was water containing dissolved ammonia. When the water contacted the air stream, the latter material stripped some of the ammonia from the water. From appropriate analyses of the streams entering and leaving the two contacting columns, it was possible to calculate the Murphree Plate Efficiencies of the contacting stages. These determinations were made over a range of $L/V$ ratios, e. g., weight ratio of water to air fed to the stage. The results of these tests are presented in the following table:

Table II

| Col. Dia. | Superficial Gas Vel., ft./sec. | Murphree Plate Efficiencies, Percent | | |
|---|---|---|---|---|
| | | $L/V=0.5$ | $L/V=1.0$ | $L/V=1.5$ |
| 2-inch | 146 | 34 | 46 | 58 |
| 2-foot | 146 | 64 | 100 | 100+ |
| 2-foot | 98 | 47 | 69 | 91 |

The plate efficiencies obtained by means of the present contact apparatus are very impressive, since the plate efficiencies for conventional bubble cap plates are generally in the range of about 25% to 50%. It is also of great interest to note that the plate efficiencies increase markedly with increases in vapor and/or liquid feed rates. This latter effect is a particularly notable one, since the efficiencies of conventional contact plates generally decrease in value under the same conditions. This feature of the present apparatus and process is especially valuable in absorption and stripping operations.

EXAMPLE III

A number of tests were made to determine the relationship between the angle of inclination of the vanes in the present type of apparatus and the angles of swirl imparted to the gas stream. These tests were carried out in a single stage, 2-foot diameter, vertical column employing air as the gas. The air was passed through the column at a superficial velocity of 100 ft. per second in all instances. No liquid was injected into the column, and sets of the various vane types shown in Fig. 3 were employed. Small flags were positioned throughout the column to indicate the angle of swirl of the gas stream. The average swirl angles obtained for various angles of inclination for each of the vane types are presented below.

Table III

SWIRL ANGLE IN DEGREES VS. VANE ANGLE

| | Average Swirl Angle, degrees | | | |
|---|---|---|---|---|
| Vane Angle, degrees [1] | 10 | 20 | 30 | 40 |
| Vane Type: | | | | |
| 1. Thin, flat | | 28 | 37 | 46 |
| 2. Thin, curved | 33 | 39 | 43 | 48 |
| 3. Airfoil | 30 | 36 | 41 | |
| 4. Thin, curved with extended trailing edge | 32 | 38 | 42 | |

[1] Vane angle selected was that of the trailing edge.

EXAMPLE IV

A series of runs were made in the 2-foot diameter column described in the previous examples in order to determine the effect of the swirl angle of the gas stream in the present apparatus on the degree of liquid entrainment. In this series, air was employed as the gas, and water was employed as the liquid. The air was passed through the single contacting stage at a superficial velocity of 100 ft./sec., while the water was supplied at 2 different rates: 50 gal./min. and 228 gal./min. The distance between the water inlet and the water outlet was maintained at 6 feet throughout.

The amount of water collected through the liquid outlet was measured for each set of conditions, and the effect of the conditions upon collection efficiency thereby determined. The results are presented in Fig. 8, where angle of inclination of the vanes is plotted against collection efficiency. It will be noted that the vanes in these tests consisted of thin flat vanes.

Figure 8:
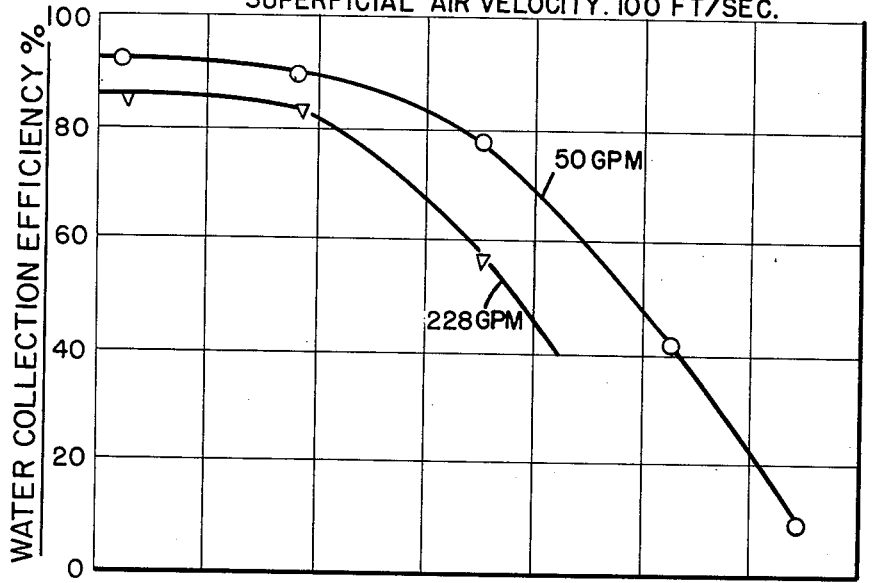
Fig. 8 illustrates the effect that the vane angle of the present apparatus has upon the efficiency of separating water particles from an air stream at different water flow rates.

Fig. 8 clearly demonstrates the marked effect that vane angle and therefore swirl angle has upon collection efficiency. It will be particularly noted that (1) vane angles up to about 50° result in good collection efficiencies and relatively little entrainment, and (2) that collection efficiency falls off somewhat with increasing liquid feed rates.

While the data in Fig. 8 have been obtained on water and air, it is considered that other vapor-liquid systems possess the same general characteristics and follow the same general trends.

EXAMPLE V

Figure 9:
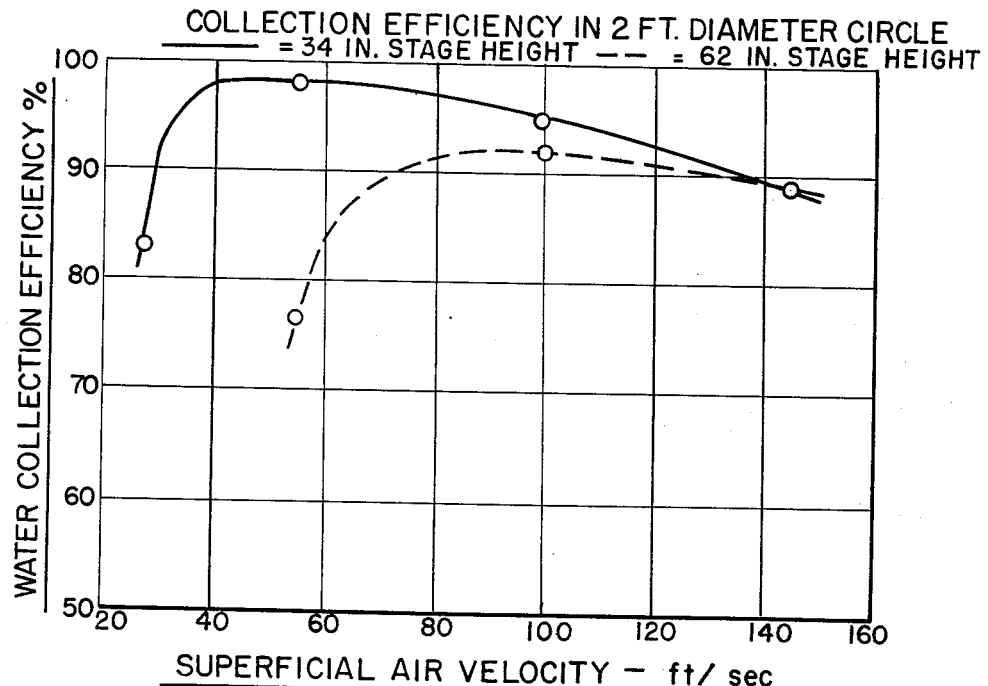
Fig. 9 illustrates the effect that the flow rate of an air stream has upon the efficiency of separating water particles from the air stream at different stage heights.

Still another set of experiments resulted in the data presented in Fig. 9. In this instance, as in Example 4, a 2-foot diameter column was employed. Water and air served as the two fluid streams. Air was supplied to the column at a rate sufficient to provide superficial velocities of 28 to 146 ft./sec., and water was introduced at the rate of 50 gallons per minute. The stage height was varied—some runs being made at a stage height equivalent to 1½ column diameters and some at a stage height equivalent to about 2½ column diameters. Once again, the amount of water collected at the liquid outlet of the apparatus was measured for each set of conditions and the collection efficiencies thereby determined.

The effect of gas velocity on collection efficiencies is readily apparent in Fig. 9. For example, collection efficiencies appear to be very low at relatively low gas velocities. They increase rapidly, however, with gas velocity, pass through a maximum and then again decrease in value.

Likewise, the height of the contacting stages in the present apparatus have a marked effect upon collection efficiency. Fig. 9, for example, shows that an increase of stage height from 1½ diameters to 2½ diameters tends to shift the entire relationship between collection efficiency and gas velocity. The same general characteristics, however, prevail.

It is interesting to note that a similar test was made employing a superficial gas velocity of 100 ft./sec. and a liquid feed rate of 50 GPM but with a stage height equivalent to 1 column diameter. In this instance, the collection efficiency was 65%, thus demonstrating the importance of stage height as an operating factor.

Runs were also made at the 1½ and 2½ diameter stage heights and at air velocities of 55 to 146 ft./sec. but with a water feed rate of 90 gal./min. In this instance, the same type curves were obtained as for the 50 gal./min. water rate, but the larger stage height in this instance provided the higher collection efficiencies except at the lowest air velocity. Thus, the importance of stage height, gas velocity, and liquid feed rate as operating factors cannot be overemphasized.

To summarize briefly, the present invention comprises an apparatus for contacting a gas or vapor with a liquid. The gas is introduced within a substantially cylindrical zone and progresses longitudinally through the zone. Means are provided within the zone to impart a rotational movement to the gas stream and thereby cause the stream itself to approach resemblance to a cylinder that is revolving about its longitudinal axis. This cylinder of gas advances through the zone so that each particle of gas follows a path that is essentially helical in character.

At one or more points throughout the zone, liquid is introduced within the cylinder of gas near its longitudinal center line. Upon contact with the gas, the liquid is shredded into small particles which are thrown toward the periphery of the gas cylinder. The liquid particles that reach the periphery of the gas cylinder impinge upon the interior surface of the wall of the zone and flow along the wall until they reach an opening therein. The liquid product leaves the zone through this opening while the gas proceeds through the zone.

It will be appreciated that many variations and modifications may be incorporated within this basic concept without departing from the scope or spirit of the present invention.

What is claimed is:

1. A liquid-vapor contacting apparatus comprising a substantially cylindrical vessel having a vapor inlet at one end and a vapor outlet at the opposite end and divided by circumferential slots into a plurality of longitudinally-spaced contacting zones; annular receiver chambers affixed to the outer surface of said vessel surrounding each of said slots and provided with product outlets; liquid inlets extending into each of said zones and terminating on the longitudinal center line of said vessel, each inlet being adapted to discharge downstream at a point from one-half to 6 zone diameters from the downstream slot adjacent the zone in which said inlet is located; a first set of overlapping, arcuately-spaced vanes in each zone extending radially from substantially the longitudinal center line of said vessel at a point upstream of said liquid inlet to the wall of said zone; and a second set of overlapping, arcuately-spaced vanes in each zone extending radially from substantially the longitudinal center line of said vessel at a point downstream from said liquid inlet to the wall of said zone, said vanes being tilted in a common direction at an angle less than 50° to a normal plane through the longitudinal axis of said vessel.

2. An apparatus as defined by claim 1 wherein said liquid inlet in each zone is positioned from 1 to 3 zone diameters from the downstream slot adjacent said zone.

3. An apparatus as defined by claim 2 wherein said vanes are airfoil-type vanes.

4. An apparatus as defined by claim 3 wherein said liquid inlets are provided with liquid dispersion devices.

5. An apparatus as defined by claim 4 wherein conduits are provided for conveying liquid from said receiver chambers to the liquid inlets in upstream contacting zones.

References Cited in the file of this patent

UNITED STATES PATENTS

| | | |
|---|---|---|
| 1,670,743 | Schneible | May 22, 1928 |
| 2,189,491 | Hawley | Feb. 6, 1940 |
| 2,409,088 | Weits et al. | Oct. 8, 1946 |
| 2,496,281 | Fisher | Feb. 7, 1950 |
| 2,560,072 | Bloomer | July 10, 1951 |
| 2,560,073 | Bloomer | July 10, 1951 |
| 2,649,291 | Bartolucci | Aug. 18, 1953 |

FOREIGN PATENTS

| | | |
|---|---|---|
| 48,856 | Norway | Jan. 12, 1931 |
| 429,604 | Great Britain | June 4, 1935 |